United States Patent
Bellahcene et al.

(10) Patent No.: US 9,372,547 B2
(45) Date of Patent: Jun. 21, 2016

(54) METHOD AND DEVICE FOR MANAGING A KEY MATRIX, CORRESPONDING COMPUTER PROGRAM PRODUCT AND STORAGE DEVICE

(71) Applicant: Compagnie Industrielle Et Financiere D'Ingenierie, Paris (FR)

(72) Inventors: Mohammed Bellahcene, Lyons (FR); Olivier Benoit, Malissard (FR); Jean-Jacques Delorme, Saint-Marcel-les-Valence (FR)

(73) Assignee: INGENICO GROUP, Paris (FR)

( * ) Notice: Subject to any disclaimer, the term of this patent is extended or adjusted under 35 U.S.C. 154(b) by 241 days.

(21) Appl. No.: 14/354,844

(22) PCT Filed: Oct. 25, 2012

(86) PCT No.: PCT/EP2012/071189
§ 371 (c)(1),
(2) Date: Apr. 28, 2014

(87) PCT Pub. No.: WO2013/060801
PCT Pub. Date: May 2, 2013

(65) Prior Publication Data
US 2014/0285365 A1    Sep. 25, 2014

(30) Foreign Application Priority Data
Oct. 28, 2011    (FR) ...................................... 11 59798

(51) Int. Cl.
*H03K 17/94*    (2006.01)
*G06F 3/02*    (2006.01)
(Continued)

(52) U.S. Cl.
CPC ........ *G06F 3/02* (2013.01); *G06F 21/83* (2013.01); *H03M 11/006* (2013.01); *G06F 3/0238* (2013.01); *H03M 11/02* (2013.01); *H03M 11/04* (2013.01); *H03M 11/20* (2013.01)

(58) Field of Classification Search
USPC .......................................................... 341/22
See application file for complete search history.

(56) References Cited

U.S. PATENT DOCUMENTS 3,639,913 A * 2/1972 Watson .................... G06F 1/02
711/200
4,528,660 A * 7/1985 Gentry .................... H04J 3/175
340/146.2
(Continued)

FOREIGN PATENT DOCUMENTS

EP     0248712 A1 * 12/1987 ............. G06F 21/31
EP     0248712 B1    10/1991
(Continued)

OTHER PUBLICATIONS

International Search Report dated Feb. 4, 2013 for corresponding International Application No. PCT/EP2012/071189, filed Oct. 25, 2012.
(Continued)

*Primary Examiner* — Jennifer Mehmood
*Assistant Examiner* — Rufus Point
(74) *Attorney, Agent, or Firm* — David D. Brush; Westman, Champlin & Koehler, P.A.

(57) ABSTRACT

A method for managing, by device, a matrix of keys, including at least one line and at least two columns, each key making short circuiting a line and a column when pressed. The method includes a sweeping phase, including, for each line: writing a predetermined logic value in the line; and for each column, reading a logic value in the column and comparing the read logic value and the predetermined logic value. For each line processed: the writing step is carried out during a predetermined time interval. For each column, the reading step is carried out during a first portion of the time interval. The sweeping phase further includes, for each column, writing the predetermined logic value in the column during a second portion of the predetermined time interval. The predetermined time interval is equal to the sum of the durations of the first and second portions.

8 Claims, 12 Drawing Sheets

Detect key 6 pressed, reading in A

(51) Int. Cl.
  *G06F 21/83*  (2013.01)
  *H03M 11/00*  (2006.01)
  *H03M 11/04*  (2006.01)
  *G06F 3/023*  (2006.01)
  *H03M 11/20*  (2006.01)
  *H03M 11/02*  (2006.01)

(56) References Cited

U.S. PATENT DOCUMENTS

| | | | | |
|---|---|---|---|---|
| 5,113,380 | A * | 5/1992 | Levine | G04G 11/00 368/10 |
| 5,649,217 | A * | 7/1997 | Yamanaka | G06F 5/065 370/372 |
| 6,054,940 | A | 4/2000 | Greene | |
| 8,316,237 | B1 * | 11/2012 | Felsher | H03L 9/0825 380/282 |
| 2001/0014944 | A1 | 8/2001 | Ibi et al. | |
| 2008/0030437 | A1 * | 2/2008 | Iida | G09G 3/3233 345/80 |
| 2010/0026529 | A1 | 2/2010 | Miller | |
| 2012/0229412 | A1 * | 9/2012 | Nurmi | H03M 11/20 345/173 |
| 2013/0322461 | A1 * | 12/2013 | Poulsen | H04J 3/02 370/458 |
| 2013/0322462 | A1 * | 12/2013 | Poulsen | H04J 3/06 370/458 |
| 2014/0259165 | A1 * | 9/2014 | Bellahcene | G06F 21/83 726/22 |
| 2014/0285365 | A1 * | 9/2014 | Bellahcene | G06F 21/83 341/22 |

FOREIGN PATENT DOCUMENTS

| | | | |
|---|---|---|---|
| EP | 0809171 A1 * | 11/1997 | G06F 21/31 |
| FR | 2599525 A1 | 12/1987 | |

OTHER PUBLICATIONS

English translation of the International Written Opinion dated Feb. 4, 2013 for corresponding International Application No. PCT/EP2012/071189, filed Oct. 25, 2012.

French Search Report dated Jul. 5, 2012 for corresponding French Application No. 1159798, filed Oct. 28, 2011.

* cited by examiner

US 9,372,547 B2

METHOD AND DEVICE FOR MANAGING A KEY MATRIX, CORRESPONDING COMPUTER PROGRAM PRODUCT AND STORAGE DEVICE

1. CROSS-REFERENCE TO RELATED APPLICATIONS

This Application is a Section 371 National Stage Application of International Application No. PCT/EP2012/071189, filed Oct. 25, 2012, which is incorporated by reference in its entirety and published as WO 2013/060801 on May 2, 2013, not in English.

2. FIELD OF THE INVENTION

The field of the invention is that of matrix keyboards or keypads, i.e. keypads comprising a matrix of keys enabling a user to key in or enter characters (letters, figures, symbols, etc.).

More specifically, the invention concerns a technique for the secured management of a matrix of keys such as this by a device (for example a processor) in order to determine a key or keys pressed by the user. This technique is also called a "keyboard or keypad scan routine".

The invention can be applied especially but not exclusively to the keypad of a payment terminal used to pay for purchases of goods and services. In this case, the keypad is used by the salesman to enter the amounts of the transactions and also by the customers to enter their confidential codes (PIN or Personal Identity Numbers).

The invention is not limited to a particular type of keypad and is applicable whatever the number and nature of the keys of the keypad (numerical keys, function keys, etc).

3. TECHNOLOGICAL BACKGROUND

FIG. 1 shows an example of a numerical keypad comprising a matrix of keys connected to a processor 10. In this example, the matrix of keys comprises ten keys (associated with the digits 0 to 9), four rows (referenced LG0 to LG3) and three columns (referenced COL0 to COL2). Each key, when pressed, enables a row and a column of the matrix to be short-circuited. For example, when the key associated with the digit 6 is pressed, it short-circuits the row LG1 and the column COL1.

For the processor 10, the classic technique for managing a matrix of keys is to perform several successive iterations of a scan phase. As illustrated in FIG. 2, each iteration of the scan phase comprises the following steps for each of the rows LG0 to LG3 processed successively:

writing a predetermined logic value (logic level "0" in the example of FIG. 2) to the row; and for each column COL0 to COL2, reading (symbolized by the letter "r" in FIG. 2) a logic value in the column to determine whether the column is short-circuited with the row, by comparison between the logic value read and the predetermined logic value.

In other words, when the processor executes an iteration of the scan phase, it writes to the rows one by one and reads the columns simultaneously. The processor can thus detect the fact that only one key has been pressed or else that several keys have been pressed simultaneously.

In the example of FIG. 2, and here below in the description, the writing to the rows and the reading in the columns are done at logic level "0" in assuming that the rows and the columns are at the default logic value "1". It is clear however that the principle remains the same if the use of the logic levels "0" and "1" is reversed (i.e. if the writing to the rows and the reading on the columns are done at the logic level "1" assuming that the rows and columns are at the default logic level "0").

The above formulation, which is based on a matrix of keys (matrix M) and the notion of successive writing to the rows of this matrix M and simultaneous reading in the columns of this matrix M is considered to be a generic formulation. Indeed, there is an alternative in which writing is done successively in the columns of this matrix M and reading is done simultaneously in the rows of this matrix M. However, this alternative can be performed according to the previous formulation if we consider a new matrix M' in which the rows correspond to the columns of the matrix M and the columns correspond to the rows of the matrix M.

In the example of FIG. 2, it is assumed that the key 6 is pressed. The processor therefore detects a short circuit between row LG1 and the column COL1 and deduces from this that the key 6 situated at the intersection between this row LG1 and this column COL1 has been pressed.

There is a need to make the classic technique for managing a matrix of keys (i.e. the classic keypad scan routine) secure. This question is raised in the patent document FR2599525, which points to a risk that malicious individuals might try to intercept a confidential code when the operation passes from the keypad to means for the matrix analysis of the keypad, by row and by column. Later in the description, these means are also called a device for managing the matrix of keys, or again a processor. The document FR2599525 specifies that knowledge of the waveform of the signals of analysis of the keypad enable a snooper device to immediately make a trace-back to any confidential information struck on the keypad. To snoop on the keypad, it is enough to have a few connections (through probes) on the rows and columns of the matrix of keys of the keypad. Snooping on the signals present in the rows and columns of the matrix can also be done by analysis of electromagnetic rays known as electromagnetic analysis or EMA. However, it is assumed that the signals flowing within the device for managing the matrix of keys are relatively complex, thus making it difficult for them to be used to retrieve confidential information struck on the keypad. Consequently, the device for managing the matrix of keys is called a "protected module" in the document FR2599525.

In order to improve the security of the keypad, the document FR2599525 proposes that the device for managing the matrix of keys ("protected module") should apply countermeasures to hinder the possibility of interception of any confidential information (a confidential code for example) struck on the keypad through snooping on the state of the rows and columns of the matrix of keys of the keypad.

More specifically, the technique proposed by the document FR2599525 combines the following:

a first mechanism for simulating: the protected module is provided with two-way links towards at least certain of the columns and rows of the keypad and the protected module comprises means for simulating a false activation of keys, at least some of the interrogation pulses being applied at the same time to at least one row and at least one column;

a mechanism for the true exploration of the keypad: the protected module explores the keypad key by key, in scrutinizing at each time a row or a column known as an "effectively analyzed" row or column, that receives no interrogation pulse (coming from the protected module). During this true exploration, the invention also proposes a complementary simulation when the protected module is in the presence of a non-transference of the start of the interrogation pulse to the column or row analyzed (i.e. one or more explored keys are not actuated): the protected module then responds to this condition by applying a dummy pulse to the column or row analyzed which ends with the interrogation pulse (the start of this pulse being, on the contrary, slightly delayed relative to the start of the interrogation pulse, given the decision time needed for the protected module);

a second simulation mechanism: the protected module carries out no true interrogation of a chosen key during a predetermined time corresponding to the normal time of actuation of a key and, during this same period, it creates a false response which can be attributed to this chosen key.

Two embodiments of these mechanisms are proposed.

In the first embodiment, the protected module is provided with two-way links towards all the columns of the keypad:

for the first simulation mechanism, the protected module has a state of pure simulation in which it applies the interrogation pulse to a row and to all the columns of the keypad;

for the mechanism of true exploration of the keypad (key by key), the protected module applies the interrogation pulse to a row and to all the columns except to an analyzed column, the key effectively explored being defined by the interrogated row and the analyzed column.

In the second embodiment, the protected module is provided with two-way links towards all the rows and all the columns of the keypad:

for the first simulation mechanism, the protected module has a pure simulation state in which it applies the interrogation pulse to all the rows and all the columns of the keypad;

for the mechanism of true exploration of the keypad (key by key), the protected module applies the interrogation pulse on the one hand to all the rows and columns except to an analyzed row, and, on the other hand, to all the rows and columns except to an analyzed column, the key effectively explored being defined by the row and the column analyzed.

While the technique of the document FR2599525 improves the security of the keypad, it is however not optimal. Indeed, the duration and resources of computation needed for executing the mechanism of true exploration of the keypad are not optimized since this is a key-by-key exploration.

It will be noted that the second embodiment is even more costly in computation time and resources than the first embodiment since each key is explored in two steps, firstly through the row to which the explored key belongs and then through the column to which this explored key belongs. A greater number of sequences of interrogation signals therefore has to be generated in a same period of time so as not to lose information on the real state of the keypad.

4. SUMMARY OF THE INVENTION

A preferred embodiment of the invention proposes a method for the management, by a device, of a matrix of keys comprising at least one row and at least two columns, each key making it possible, when it is pressed, to short-circuit a row and a column of said matrix, the method comprising at least one iteration of a scan phase comprising the following steps for each of the rows processed successively: writing a predetermined logic value to the row; and for each column, reading a logic value on the column to determine whether the column is short-circuited with the row by comparison between the logic value read and the predetermined logic value. For each of the rows processed successively:

the step for writing the predetermined logic value on the row is performed during a predetermined time slot;

for each column, the step for reading a logic value on the column is performed during a first part of the predetermined time slot;

the scan phase comprises an additional step, for each column, for writing the predetermined logic value to the column during a second part of the predetermined time slot, the duration of the predetermined time slot being equal to the sum of the duration of the first and second parts.

In other words, during this predetermined time slot (T), for each of said columns:

the step for reading a logic value in the column is performed during a first part (T1) of said predetermined time slot (T);

the scan phase comprises an additional step for writing the predetermined logic value to the column during a second part (T2) of said predetermined time slot (T), the duration of said predetermined time slot (T) being equal to the sum of the durations of the first and second parts.

Thus, the device (which manages the matrix of keys of the keypad) implements a first countermeasure aimed at making the signals present in the columns as independent as possible of the key or keys pressed, while at the same time reducing the duration of exploration of the keypad. To this end, for a given row to which it writes during a time slot T, the device reads and writes on each column: reading during T1 and writing during T2, with: T1+T2=T. Hence, unlike in the technique known from the document FR2599525 (which proposes a key-by-key exploration), the device of the invention simultaneously explores all the keys associated with a same row.

Thus, if the key associated with a given row is pressed, only the signal present in the column associated with this key is slightly different from the signals present in the other columns. This signal does not have the same value as the others during T1 since it takes the predetermined logic value written to the given row. However, it is identical to the other signals during T2 since the predetermined logic value is written to all the columns. In other words, within a time slot T:

if no key is pressed, the signal edges indicating the passage of a predetermined logic value (start of T2) are synchronous for all the columns;

if a key is pressed, the signal edges indicating the passage to a predetermined logic value (start of T2) are synchronous for all the columns except for the column associated with the key pressed (for this column, this signal edge corresponds to the start of T1, and is therefore in advance relative to the synchronous edges of the other columns).

The above formulation, which is based on a matrix of keys (matrix M) and the notions of successive operations of writing (during T) to each of the rows of this matrix M and operations of reading (during T1) and writing (during T2) to each of the columns of this matrix M, is generic. Indeed, there is an alternative which consists in successively writing (during T) to each of the columns of this matrix M and in reading in (during T1) and writing (during T2) to each of the rows of this matrix M. However, this alternative can be processed according to the previous formulation if we consider a new matrix M' in which each of the rows corresponds to the columns of the matrix M and the columns correspond to the rows of the matrix M.

According to one particular aspect of the invention, for each column, the order of steps for reading and writing during the predetermined time slot is selected randomly.

In other words, for each column, the device makes a random choice between: a reading during T1 and then a writing during T2 or else a writing during T2 and then a reading during T1.

Thus, the device (which manages the matrix of keys of the keypad) implements a second countermeasure in combination with the first countermeasure. This second countermeasure is aimed at making it more difficult to detect a pressed key. The random aspect also prevents any learning by a snooper device. Indeed, within a time slot T:

- if no key is pressed, the signal edges indicating the passage to the predetermined logic value (start of T2) are not synchronous for all the columns because the order between the reading and writing (i.e. between T1 and T2) is not the same for all the columns;
- if a key is pressed, the signal edges indicating the passage to the predetermined logic value (start of T2) are not synchronous either for all the columns (for the column associated with the pressed key, this signal edge is not easy to locate by simple comparison with the synchronous edges of the other columns).

Advantageously, in each predetermined time slot, the duration of the second part of the predetermined time slot is identical for all the columns.

In this way, the resemblance between the signals present in the different columns is increased and the detection of a pressed key is made even more difficult.

According to one particular characteristic, the matrix of keys comprises a plurality of rows and, at each iteration of the scan phase, the order of successive processing of the rows is random.

Thus, the device (which manages the matrix of keys of the keypad) implements a third countermeasure used to further increase the complexity of the analysis of the signals present in the rows and columns that must be made by a snooper device to determine any confidential information struck on the keys of the keypad.

According to one particular aspect of the invention, the matrix of keys comprises a plurality of rows and during a given iteration of the scan phase, at least one parameter varies randomly from one row to the other, said at least one parameter belonging to the group comprising:

- the duration of the predetermined time slot;
- the duration of the first part of the predetermined time slot; and
- the duration of the second part of the predetermined time slot.

Thus, the device (which manages the matrix of keys of the keypad) implements a fourth countermeasure to further increase the complexity of analysis of the signals present in the rows and in the columns.

According to one particular characteristic, at least one iteration of the scan phase, which follows an iteration during which at least one short-circuit has been determined between a given column and a given row, comprises the following steps;

- for each of the successively processed rows, other than a given row that is short-circuited with a given column:
  - for each column, writing the predetermined logic value to the column throughout the duration of the time slot;
- for each given row short-circuited with a given column:
  - for each column other than the given column, writing the predetermined logic value to the column throughout the duration of the time slot; and
  - for the given column, reading a logic value during the first part of the time slot in order to detect a continuing or a stopping of said short-circuit between the given column and the given row, and writing the predetermined logic value during the second part of the time slot.

Thus, the device (which manages the matrix of keys of the keypad) implements a fifth countermeasure enabling the concealment of a pressure on one (or more) keys. Indeed, as soon as pressure on a key has been detected during the iteration of the scan phase, the behavior of the device in the next iterations of the scan phase is such that, so long as this key is pressed, the signals present in all the columns are identical (predetermined logic value during T). It is therefore only during two iterations (that of the detection of the key pressed and that of the detection of the release of the key) that a snooper device can know if the key has been pressed. On the other hand, however, pressure on another key cannot be detected until the detection of the release of the pressed key is iterated. It is also possible to manage simultaneous keys if they appear at the same time and in one and the same detection phase which is extremely improbable in practice.

Another embodiment of the invention proposes a computer program product comprising program code instructions for implementing the above-mentioned method (in any one of its different embodiments) when said program is executed on a computer or a processor.

Another embodiment of the invention proposes a computer-readable and non-transient storage medium storing a computer program comprising a set of instructions executable by a computer or a processor to implement the above-mentioned method (in any one of its different embodiments).

Another embodiment of the invention proposes a device for managing a matrix of keys comprising at least one row and at least two columns, each key making it possible, when it is pressed, to short-circuit a row and a column of said matrix, the device comprising means for scanning adapted to carrying out at least one iteration of a scan phase, the means for scanning comprising the following means, activated for each of the rows processed successively: means for writing a predetermined logic value to the row; and means for reading a logic value on each column to determine whether the column is shorted-circuited with the row, by comparison between the logic value read and the predetermined logic value. For each of the rows processed successively, the means for writing the predetermined logic value to the row are activated during a predetermined time interval; for each column, the means for reading a logic value on the column are activated during a first part of the predetermined time interval. The means for scanning comprise additional means for writing, activated for each column during a second part of the predetermined time slot to write the predetermined logic value to the column, the duration of the predetermined time slot being equal to the sum of the durations of the first and second parts.

In other words, the means for scanning comprise additional means for writing and, for each of the rows processed successively:

- the means for writing the predetermined logic value to the row are activated during a predetermined time slot (T);
- during said predetermined time slot (T), for each of said columns:
  - the means for reading the logic value on the column are activated during a first part (T1) of said predetermined time slot (T);
  - the additional means for writing are activated during a second part (T2) of said predetermined time slot (T) to write the predetermined logic value to the column, the duration of the predetermined time slot being equal to the sum of durations of the first and second parts.

Advantageously, the device for managing the matrix of keys comprises means for implementing steps that it performs with the method as described here above in any one of its different embodiments.

5. LIST OF FIGURES

Other features and characteristics of the invention shall appear from the following description, given by way of an indicative and non-exhaustive example, and from the appended figures, of which:

FIG. 1, already described with reference to the prior art, presents an example of a numerical keypad comprising a matrix of keys connected to a processor;

FIG. 2, already described with reference to the prior art, illustrates the classic technique of management of the matrix of keys of FIG. 1, when the key 6 is pressed;

Figure 9:
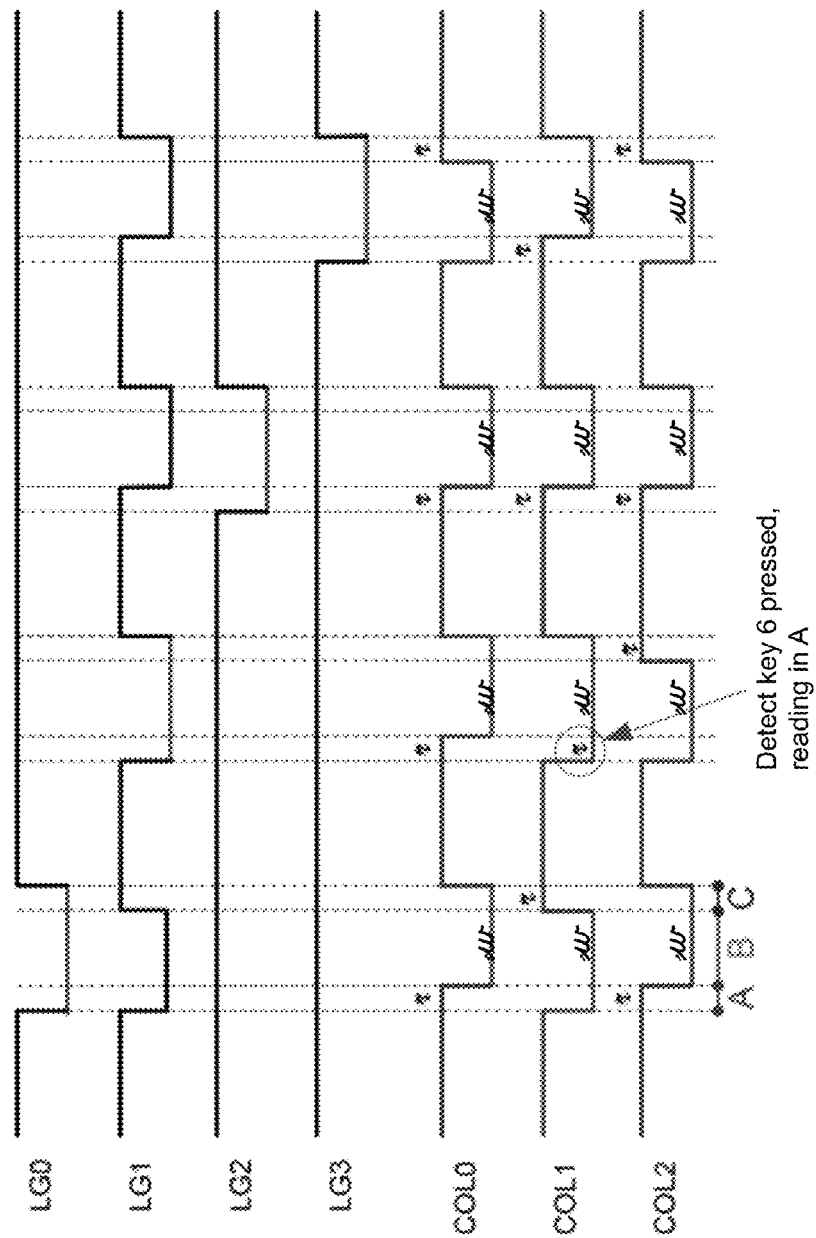
Figure 10:
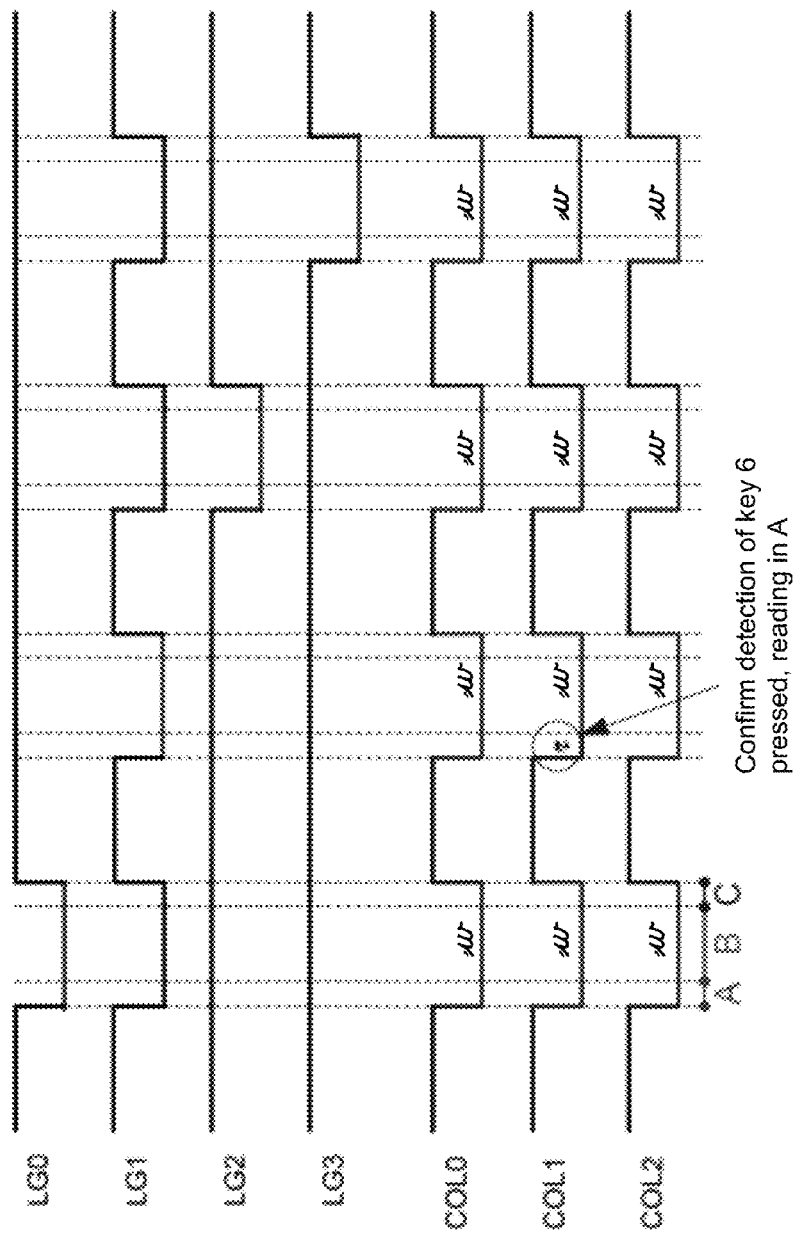
Figure 11:
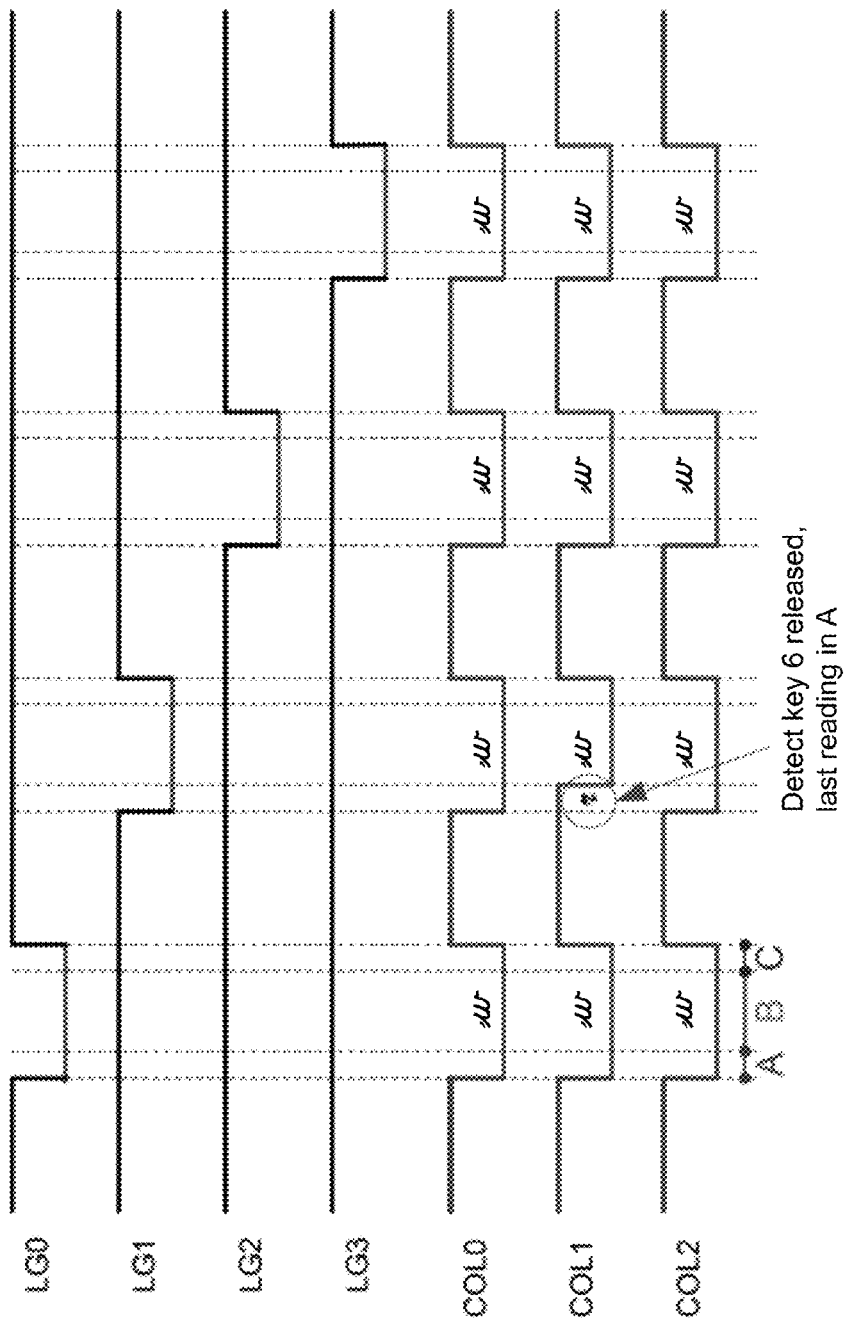
Figure 12:
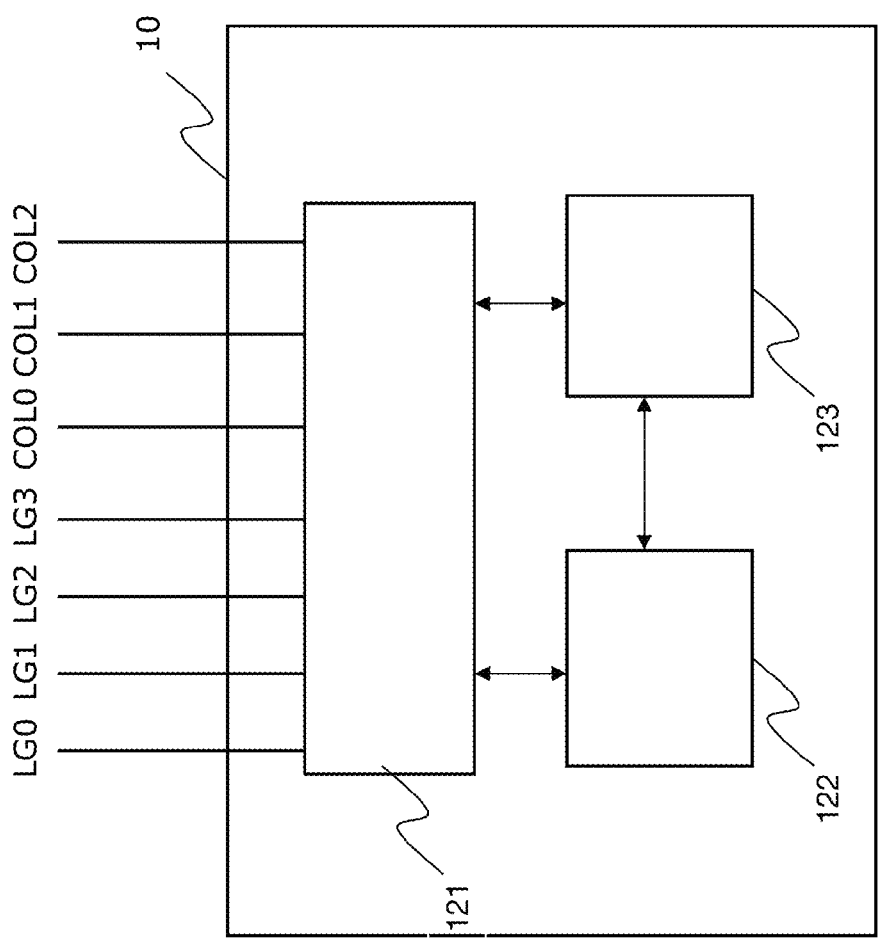

FIGS. 9, 10 and 11 illustrate a combination of the first and second countermeasures with a fifth countermeasure, according to one particular embodiment of the invention (first detection of the key 6 pressed, in FIG. 9; confirmation of the detection of the key 6 pressed, in FIG. 10; detection of the key 6 released, in FIG. 11); and FIG. 12 presents the structure of a device for managing a matrix of keys of a keypad, according to one particular embodiment of the invention.

6. DETAILED DESCRIPTION

Figure 1:
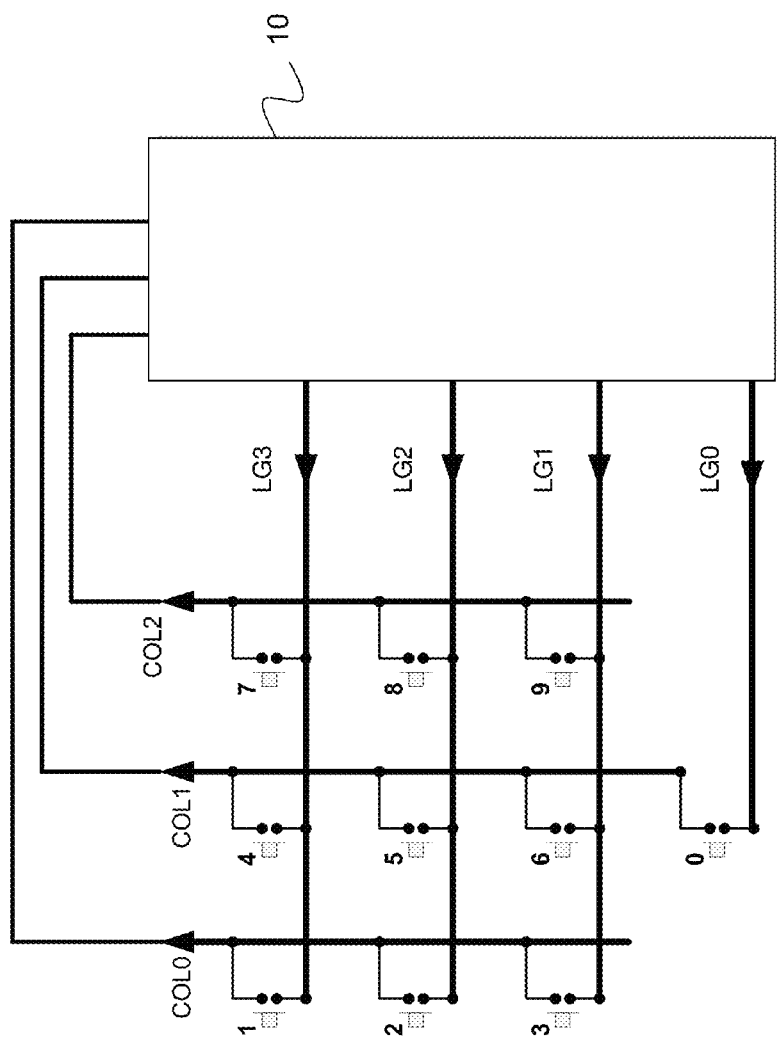
Figure 2:
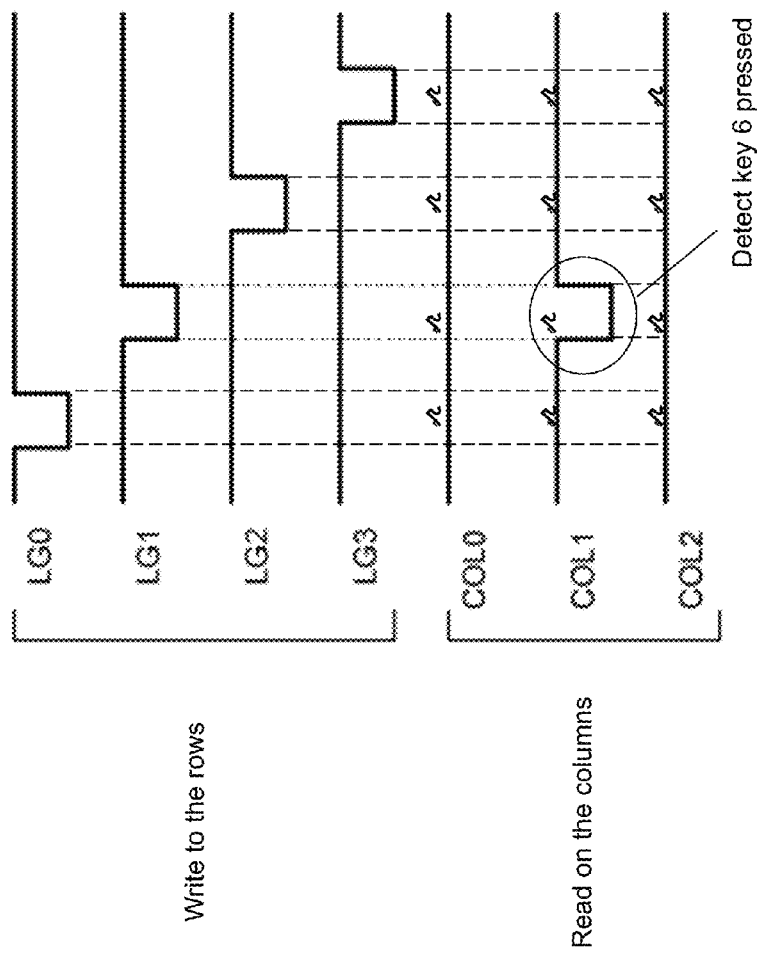

For the sake of simplification, here below in the description we use the example of the keypad of FIG. 1 with a matrix of keys comprising ten keys (associated with the digits 0 to 9), four rows (referenced LG0 to LG3) and three columns (referenced COL0 to COL2). It is clear that the countermeasures presented here below according to different embodiments of the invention are not limited to this example of a keypad.

Each of the FIGS. 3 to 6 and 8 to 11 has logic values present in the rows LG0 to LG3 and the columns COL0 to COL2 during an iteration of the scan phase. The FIG. 7 presents the logic values present in the rows LG0 to LG3 during two iterations of the scan phase.

It is assumed that the interrogation pulses have a logic level "0". It is clear that the principle remains the same if the use of the logic levels "0" and "1" is reversed.

Figure 3:
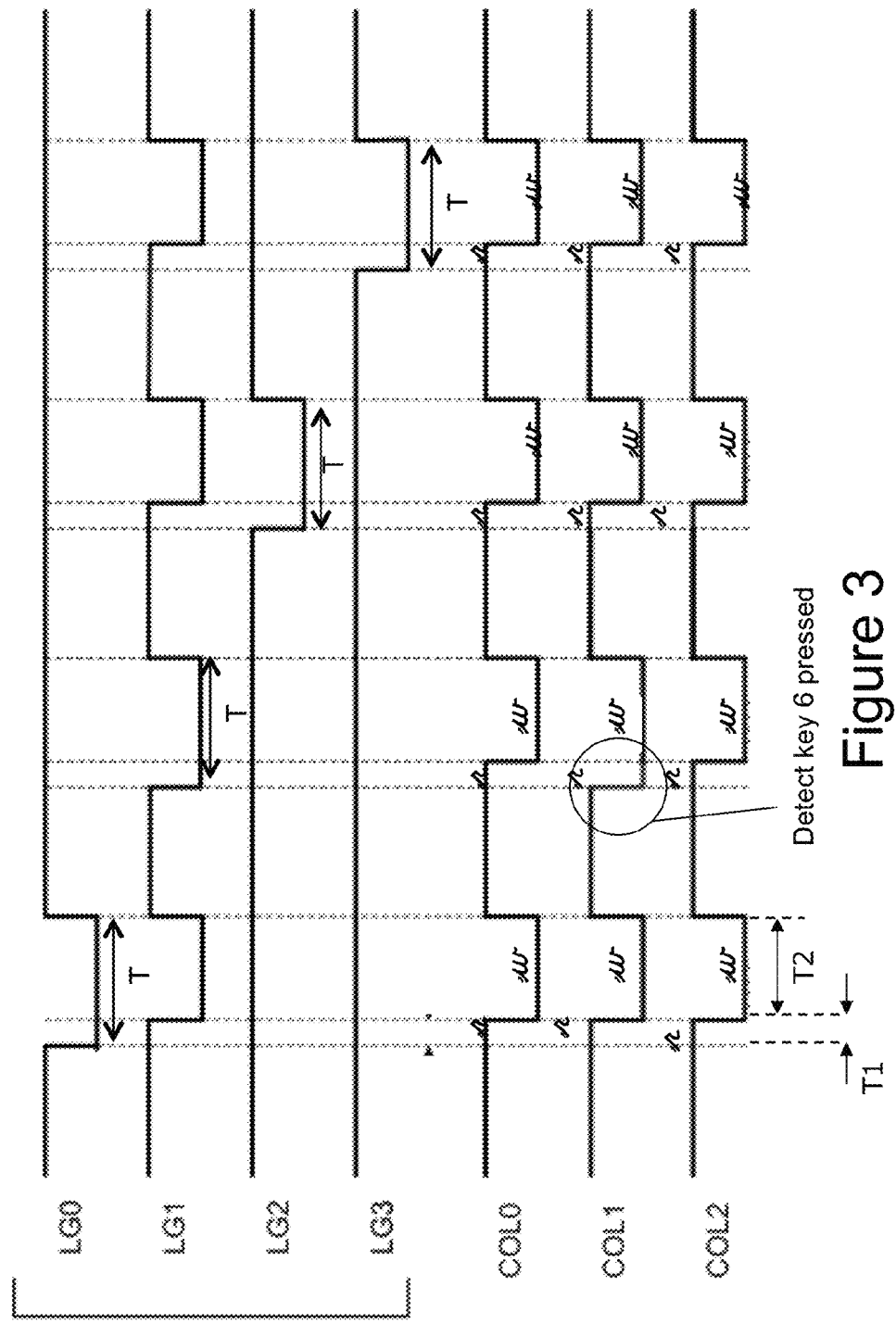
FIG. 3 illustrates a first countermeasure, according to one particular embodiment of the invention, when the key 6 is pressed.

Referring now to FIG. 3, we present a first countermeasure according to one particular embodiment of the invention. It is assumed that the key 6 is pressed.

During the time interval T for writing an interrogation pulse (logic level "0") to each of the rows LG0 to LG3, the processor performs the following steps for each column COL0 to COL2:

reading (symbolized by the letter "r" in FIG. 3) of a logic value on the column during a first part T1 of the time slot T to determine (by comparison between the logic value read and the logic value "0") whether the column is short-circuited with the row;

writing (symbolized by the letter "w" in FIG. 3) of a logic value "0" to the column during a second part T2 of the time slot T (with the duration of T being equal to the sum of the durations of T1 and T2).

Thus, in the iteration of the scan phase presented in the FIG. 3, each of the rows LG0 to LG3 can take one of the following states:

outside the time slot T, a state "not enforced by the processor" in which the row takes:

the default logic value "1" if this row is not short-circuited with a column; or the logic value of a given column, if this row is short-circuited with this given column (i.e. if the key associated with this row and this column is pressed);

during the time slot T, a state "enforced by the processor" in which the row takes the logic value "0" written by the processor.

Similarly, in the iteration of the scan phase presented in FIG. 3, each of the columns COL0 to COL2 can take one of the following states:

outside the time slot T, a state "not enforced by the processor" in which the column takes the default logic value "1";

during the first part T1 of the time slot T, a state "not enforced by the processor" (the processor reads this column) in which the column takes:

the default logic value "1" if this column is not short-circuited with the row to which the processor has written the value "0"; or the logic value "0" if this column is short-circuited with a row to which the processor has written the value "0";

during the second part T2 of the time slot T, a state "enforced by the processor" in which the column takes the logic value "0" written by the processor.

In the example of FIG. 3, the key 6 (associated with the row LG1 and the column COL1) is pressed. Hence, for each of the columns COL0 and COL2, the processor reads the logic value "1" during each first part T1 of the time slot T and writes the value "0" during each second part T2 of the time slot T. For the column COL1, the processor acts in the same way except for the time slot T for writing to the row LG1 during which the processor reads the logic value "0" during the first part T1 of this time slot (because the row LG1 is short-circuited with the column COL1) and writes the value "0" during the second part T2 of this time slot. It will be noted that, because the key 6 is pressed, the value of the row LG1 follows that of the column COL1.

A "non-enforced" state for a row or column corresponds to a port of the processor connected to this row or column and is configured at input with a pull-up resistor or pull-down resistor, this pull-up or pull-down resistor setting the electrical level.

An "enforced" state for a row or column corresponds to a port of the processor connected to this row or column and configured at output at a logic level "1" or "0".

The first countermeasure presented here above is vulnerable to a detailed analysis of the signals present on the columns COL0 to COL2 since it can be noted that, for the pair (LG1, COL1), the trailing edges are synchronous whereas for the other pairs (row, column), the trailing edge of the column signal is offset (by T1) relative to the trailing edge of the row signal.

Figure 4:
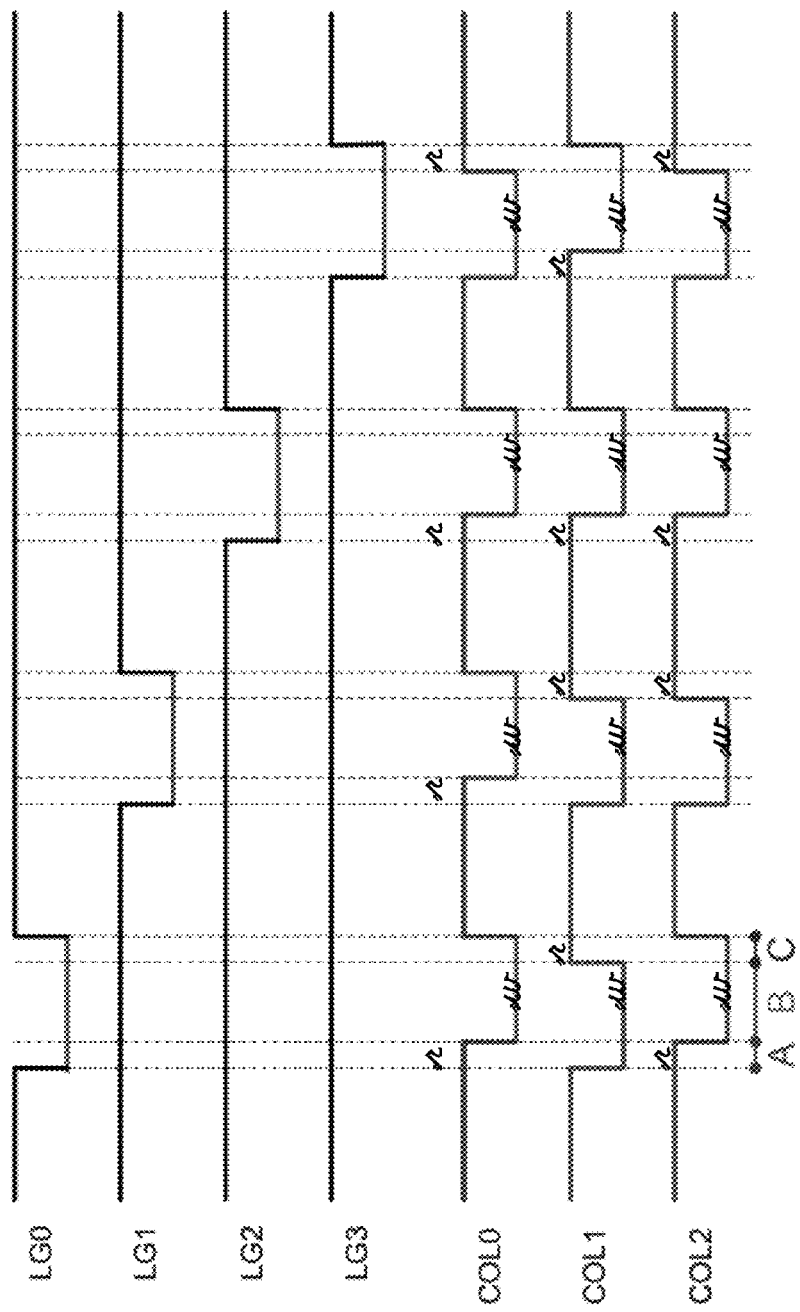
FIGS. 4, 5 and 6 illustrate a combination of the first countermeasures with a second countermeasure, according to one particular embodiment of the invention (no key pressed in FIG. 4; key 6 pressed and detected in the time slot A, in FIG. 5, and in the time slot C, in FIG. 6)
Figure 5:
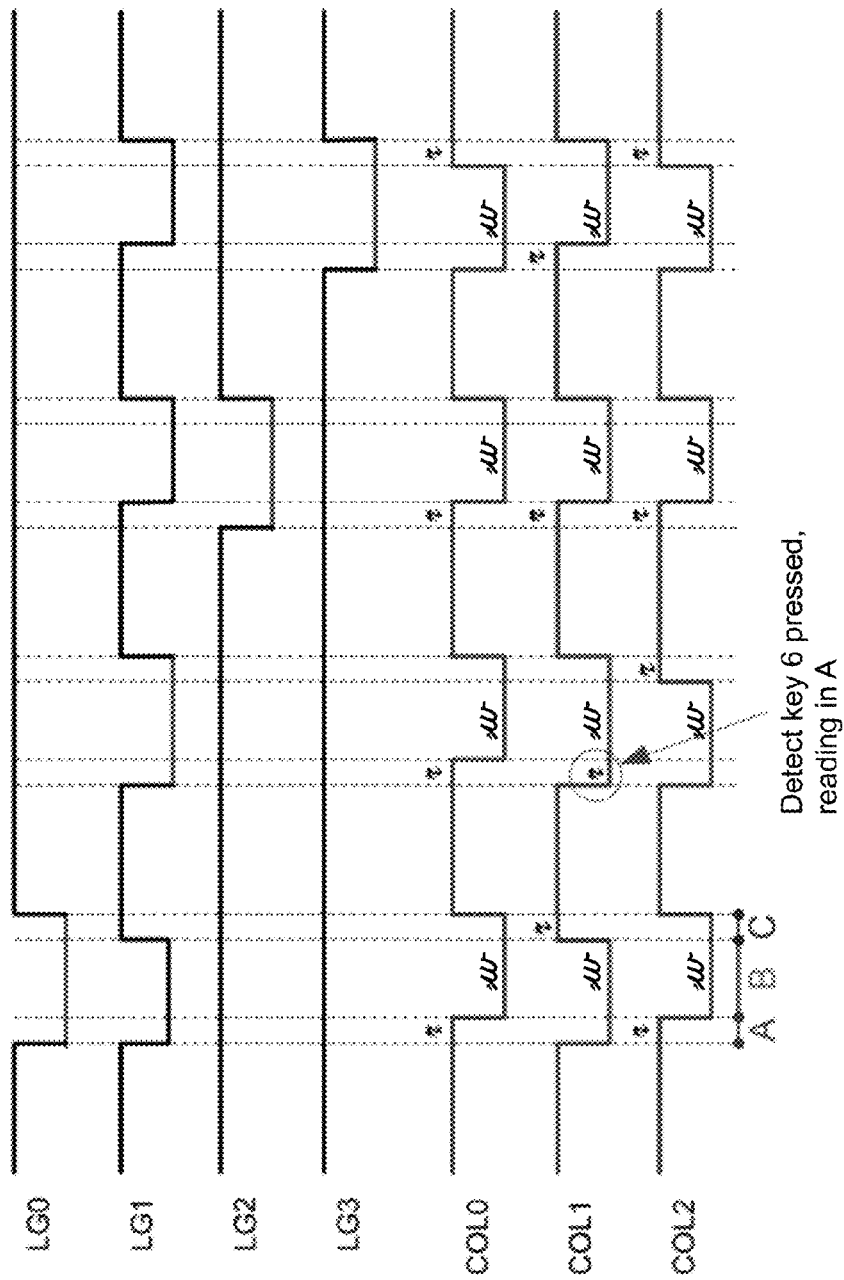
Figure 6:
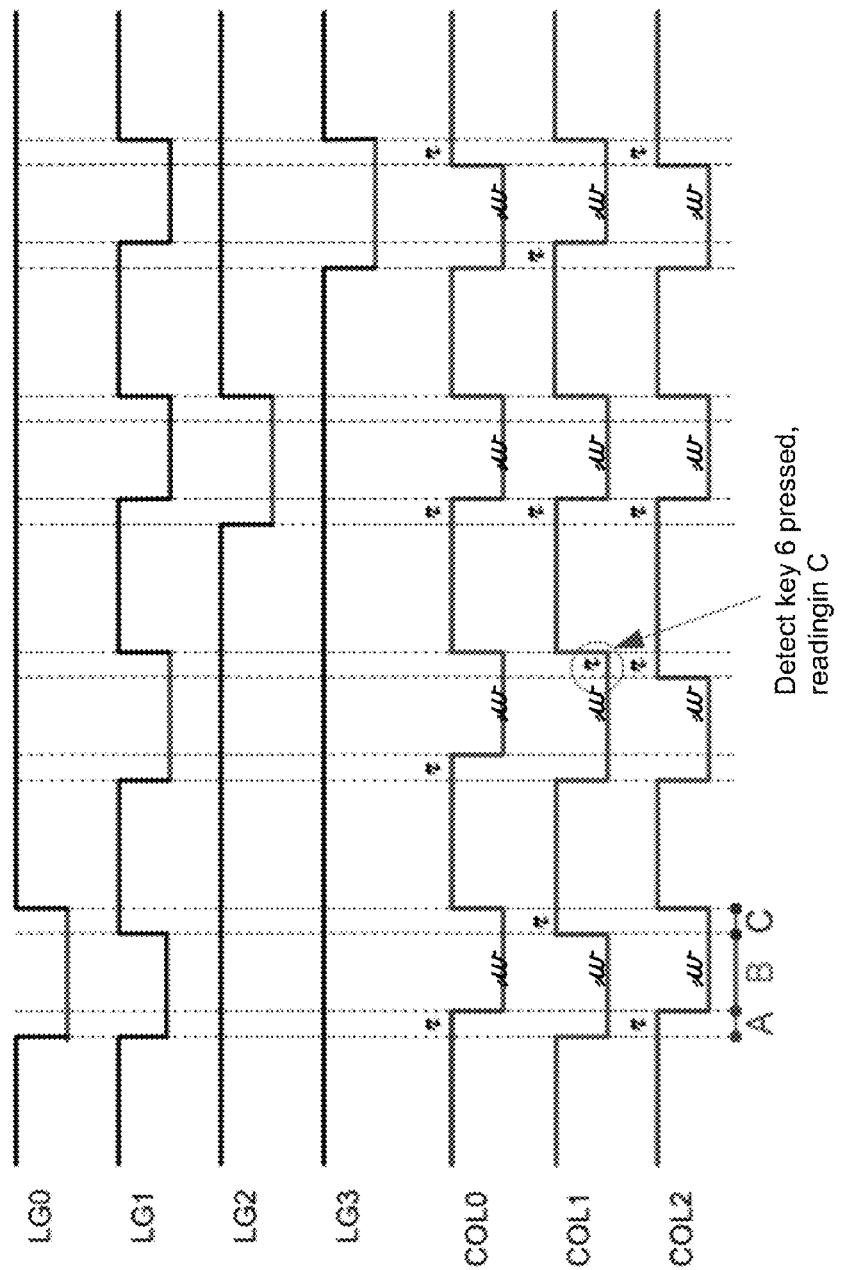
Figure 7:
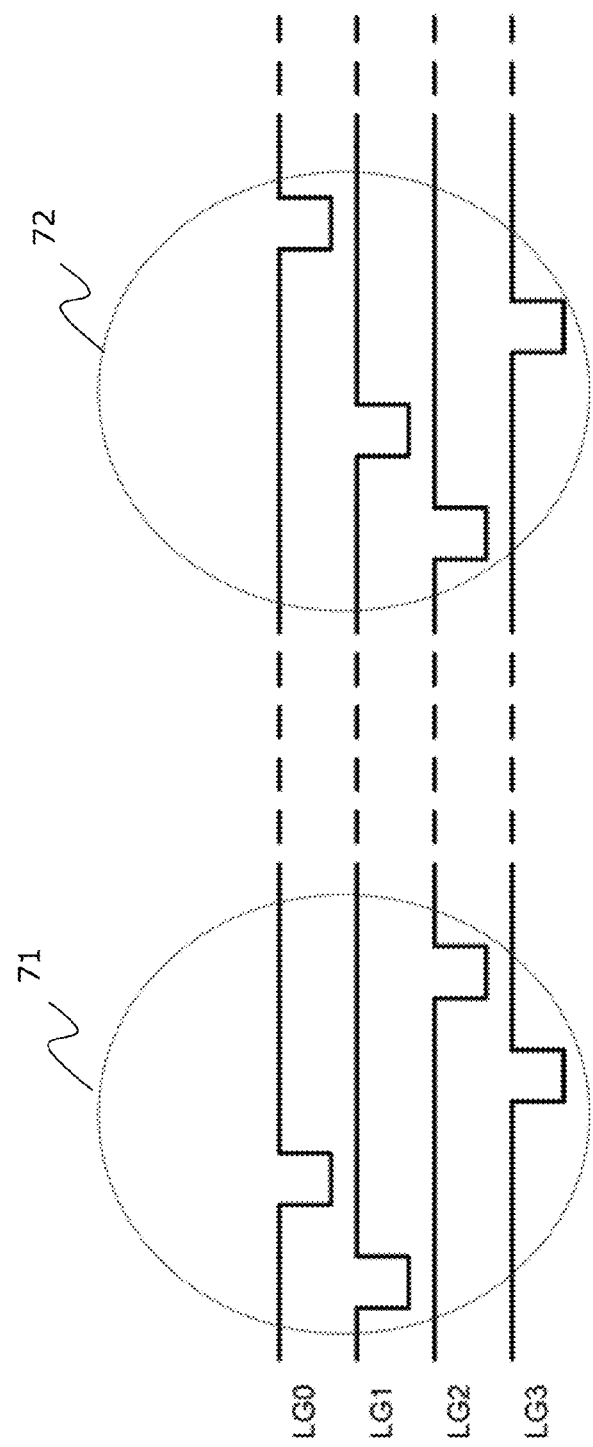
FIG. 7 illustrates a third countermeasure, capable of being combined with the first countermeasure (and any one of the other countermeasures)

FIGS. 4, 5 and 6 present a combination of the first countermeasure with a second countermeasure according to one particular embodiment of the invention.

In order to overcome the weakness of the first countermeasure, it is combined with the second countermeasure in which the processor 10 randomly selects the order of the reading operations (during T1) and writing operations (during T2) for each column COL0 to COL2.

Furthermore, during each time slot T, the duration of T2 (of writing by the processor) is identical for all the columns.

In FIGS. 4, 5 and 6, each time slot T (for writing an interrogation pulse to a row) is sub-divided into three portions named A, B and C respectively. For each COL0 to COL2, we have either: T1=A and T2=B+C (i.e. reading in A and writing to B and C), and: T1=C and T2=A+B (i.e. reading in C and writing to A and B).

In the example of FIGS. 4 and 6, we have:
T1=A and T2=B+C, for the following pairs: (LG0, COL0), (LG0, COL2), (LG1, COL0), (LG2, COL0), (LG2, COL1), (LG2, COL2) and (LG3, COL1);
T1=C and T2=A+B, for the following pairs: (LG0, COL1), (LG1, COL1), (LG1, COL2), (LG3, COL0) and (LG3, COL2).

The example of FIG. 5 can be distinguished from that of FIGS. 4 and 6 only for the pair (LG1, COL1), for which we have: T1=A and T2=B+C (i.e. reading in A instead of reading in C).

The following assumptions are made: no key is pressed in FIG. 4. In FIG. 5, the key 6 is pressed and hence detected in the portion A. In FIG. 6, the key 6 is pressed and hence detected in the portion C.

Referring now to FIG. 7, we present a third countermeasure according to one particular embodiment of the invention. It can be combined with the first countermeasure (alone or in combination with any one of the other countermeasures).

In order to further increase the complexity of the analysis of the signals of the columns and make the method implemented by the processor even less predictable, the third countermeasure consists of a random choice of the order in which the processor writes the interrogation pulse on the rows, at each iteration of the scan phase.

In the example of FIG. 7, in a first iteration referenced 71, the processor writes to the rows in the following order: LG1, LG0, LG3 and LG2. In another iteration referenced 72, the processor writes to the rows in the following order: LG2, LG1, LG3 and LG0.

Figure 8:
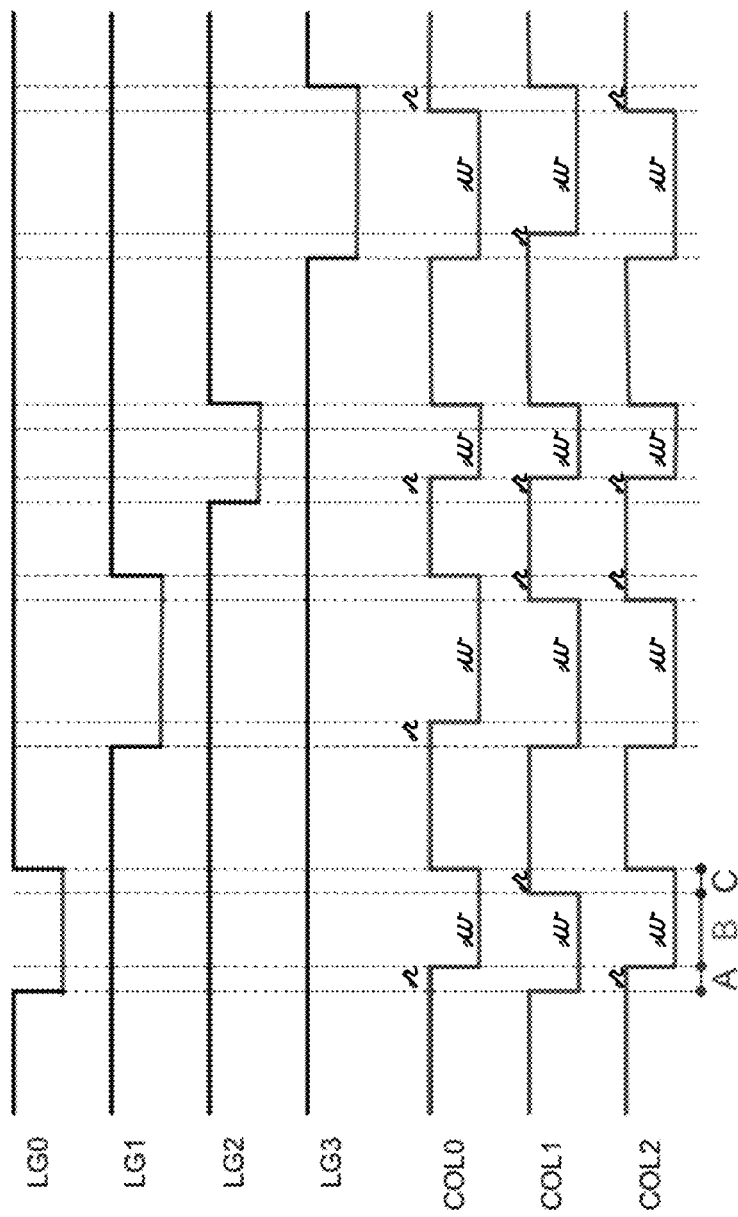
FIG. 8 illustrates a combination of the first and second countermeasures with a fourth countermeasure, according to a particular embodiment of the invention (no key is pressed)

Referring now to FIG. 8, we present a combination of the first and second countermeasures with a fourth countermeasure.

In the fourth countermeasure, the processor makes one or more of the following parameters vary randomly from one row to another at each iteration of the scan phase:
the duration of the predetermined time slot T;
the duration of the first part T1 (reading by the processor) of the time slot T; and
the duration of the second part T2 (writing by the processor) of the time slot T.

Thus, snooping with activation on a specific width is prevented.

In the example of FIG. 8, only the duration of the portion B varies randomly, hence the duration of the predetermined time slot T also varies randomly (i.e. the case of the duration of the second part T2, since T2 is equal to A+B or B+C). By contrast, the duration of the first part T1 is not variable in this example (since T1 is equal to A or C).

Referring now to FIGS. 9, 10 and 11, we present a combination of the first and second countermeasures with a fifth countermeasure according to one particular embodiment of the invention.

In the fifth countermeasure, once a pressed key has been detected during an iteration of the scan phase (here below called an iteration of detection of pressing), this pressed key is concealed during the following iterations of the scan phase (here below called iterations of confirmation of pressing), until there is a detection of a release of this key during an iteration of a scan phase (here below called an iteration of detection of release).

FIG. 9 presents an example of an iteration of detection of pressing in which a pressing of the key 6 is detected (reading at A of the logic value "0" and then reading at B and C of the logic value "0" for the pair (LG1, COL1)). This FIG. 9 is identical to FIG. 5 and is not described again.

FIG. 10 presents an example of an iteration of confirmation of pressing, in which the pressing of the key 6 is confirmed (for the pair (LG1, COL1)) reading in A of the logic value "0" then writing of the logic value "0" to B and C, i.e. T1=A and T2=B+C). In order to conceal the pressure on this key 6, for all the other pairs (row, column), the processor does not read the columns but writes only the logic value "0" throughout the duration of the time slot T of the interrogation pulse (writing during A, B and C, i.e. T2=A+B+C=T). Thus, for each time slot T, all the signals present on the different columns are strictly identical (logic value "0" during T).

FIG. 11 presents an example of an iteration of detection of release, in which the release of the key 6 is detected (for the pair (LG1, COL1), reading in A of the logic value "1" and then writing of the logic value "0" to B and C, i.e. T1=A and T2=B+C).

FIG. 12 presents a structure of a device 10 for managing a matrix of keys of a keypad according to one particular embodiment of the invention. This device implements the countermeasures presented here above or a combination of certain of these countermeasures.

In this example, the device comprises a RAM (random access memory) 123, a central processing unit or CPU 121, equipped for example with a processor and driven by a program stored in the ROM (read-only memory) 122. At initialization, the code instructions of the program are for example loaded into the RAM 123 and then executed by the processing unit 121. The processing unit 121 manages the signals on the rows and columns (LG0 to LG3 and COL0 to COL2 in this example) of the matrix of keys of the keypad according to the instructions of the program 122, in order to implement the totality or a part of the countermeasures described in detail further above.

This FIG. 12 illustrates only one particular way, among several possible ways, of carrying out the different countermeasures described in detail here above with reference to FIGS. 3 to 11. Indeed, the technique of the invention can be done equally well:
on a reprogrammable computing machine (a processor or a microcontroller for example) executing a program comprising a sequence of instructions, or
a dedicated computing machine (for example a set of logic gates such as an FPGA or an ASIC, or any other hardware module).

Should the invention be implanted in a reprogrammable computing machine, the corresponding program (i.e. the sequence of instructions) can be stored in a detachable storage medium (such as for example a floppy disk, a CD-ROM or a DVD-ROM) or non-detachable storage medium, this storage medium being partially or totally readable by a computer or a processor.

At least one embodiment of the present disclosure provides a technique for the secured management, by a device (for example a processor), of a matrix of keys of a keypad.

At least one embodiment provides a technique of this kind enabling a faster exploration of the keypad than the technique known from the document FR2599525 discussed here above.

At least one embodiment provides a technique of this kind enabling an exploration of the keypad requiring fewer computation resources than the technique known from the document FR2599525 described here above.

At least one embodiment provides a technique of this kind that is simple to implement and costs little.

At least one embodiment renders analysis of the signals more complex for a hacker.

At least one embodiment reduces the frequency of appearance of the residual signal enabling the true key pressed to be retrieved (by reducing it to the appearance and disappearance of the pressed key).

Although the present disclosure has been described with reference to one or more examples, workers skilled in the art will recognize that changes may be made in form and detail without departing from the scope of the disclosure and/or the appended claims.

The invention claimed is:

1. A method for management, by a device, of a matrix of keys comprising at least one row and at least two columns, each key making it possible, when it is pressed, to short-circuit a row and a column of said matrix, the method comprising at least one iteration of a scan phase comprising the following steps performed by the device for each of the rows processed successively:
    writing a predetermined logic value to the row; and
    for each column, reading a logic value on the column and determining whether the column is short-circuited with the row, by comparison between the logic value read and the predetermined logic value,
wherein, for each of the rows processed successively:
    the step of writing the predetermined logic value to the row is performed during a predetermined time slot;
    during said predetermined time slot, for each of said columns:
        the step of reading a logic value on the column is performed during a first part of said predetermined time slot; and
        the scan phase comprises an additional step of writing the predetermined logic value to the column during a second part of said predetermined time slot, the duration of said predetermined time slot being equal to the sum of the durations of the first and second parts.

2. The method according to claim 1, wherein, for each column, the order of steps of reading and writing during the predetermined time slot is selected randomly.

3. The method according to claim 2, wherein, in each predetermined time slot, the duration of the second part of the predetermined time slot is identical for all the columns.

4. The method according to claim 1, wherein the matrix of keys comprises a plurality of rows and, at each iteration of the scan phase, the order of successive processing of the rows is random.

5. The method according to claim 1, wherein the matrix of keys comprises a plurality of rows and, wherein, during a given iteration of the scan phase, at least one parameter varies randomly from one row to the other, said at least one parameter belonging to the group consisting of:
    the duration of the predetermined time slot;
    the duration of the first part of the predetermined time slot; and
    the duration of the second part of the predetermined time slot.

6. The method according to claim 1, wherein, at least one iteration of the scan phase, which follows an iteration during which at least one short-circuit has been determined between a given column and a given row, comprises the following steps:
    for each of the successively processed rows, other than a given row that is short-circuited with a given column:
        for each column, writing the predetermined logic value to the column throughout the duration of the time slot;
    for each given row short-circuited with a given column:
        for each column other than the given column, writing the predetermined logic value to the column throughout the duration of the time slot; and
        for the given column, reading a logic value during the first part of the time slot in order to detect a continuing or a stopping of said short-circuit between the given column and the given row, and writing the predetermined logic value during the second part of the time slot.

7. A computer readable and non-transient storage medium storing a computer program comprising a set of instructions executable by a computer or a processor to implement a method for managing, by a device, a matrix of keys comprising at least one row and at least two columns, each key making it possible, when it is pressed, to short-circuit a row and a column of said matrix, the method comprising at least one iteration of a scan phase comprising the following steps performed by the device for each of the rows processed successively:
    writing a predetermined logic value to the row; and
    for each column, reading a logic value on the column and determining whether the column is short-circuited with the row, by comparison between the logic value read and the predetermined logic value,
wherein, for each of the rows processed successively:
    the step of writing the predetermined logic value to the row is performed during a predetermined time slot;
    during said predetermined time slot, for each of said columns:
        the step of reading a logic value on the column is performed during a first part of said predetermined time slot; and
        the scan phase comprises an additional step of writing the predetermined logic value to the column during a second part of said predetermined time slot, the duration of said predetermined time slot being equal to the sum of the durations of the first and second parts.

8. A device for managing a matrix of keys comprising at least one row and at least two columns, each key making it possible, when it is pressed, to short-circuit a row and a column of said matrix, the device comprising:
    means for scanning, which carries out at least one iteration of a scan phase, the means for scanning comprising the following means, activated for each of the rows processed successively:
    means for writing a predetermined logic value to the row; and
    means for reading a logic value on each column to determine whether the column is shorted-circuited with the row, by comparison between the logic value read and the predetermined logic value, wherein the means for scanning comprise additional means for writing, and wherein, for each of the rows processed successively:
  the means for writing the predetermined logic value to the row are activated during a predetermined time slot;
  during said predetermined time slot, for each of said columns:
    the means for reading the logic value on the column are activated during a first part of said predetermined time slot;
    the additional means for writing are activated during a second part of said predetermined time slot to write the predetermined logic value to the column, the duration of the predetermined time slot being equal to the sum of durations of the first and second parts.

* * * * *